United States Patent
Kuo

(10) Patent No.: US 7,139,257 B2
(45) Date of Patent: Nov. 21, 2006

(54) SYSTEM AND METHOD FOR CODING AND IDENTIFICATION IN A WIRELESS TRANSMIT AND RECEIVE PROTOCOL FOR SINGLE-FREQUENCY PERIPHERAL DEVICES

(75) Inventor: Jerry Kuo, Keelung (TW)

(73) Assignee: Lite-On Technology Corporation, Taipei (TW)

( * ) Notice: Subject to any disclaimer, the term of this patent is extended or adjusted under 35 U.S.C. 154(b) by 1138 days.

(21) Appl. No.: 10/052,437

(22) Filed: Jan. 23, 2002

(65) Prior Publication Data

US 2003/0128675 A1    Jul. 10, 2003

(30) Foreign Application Priority Data

Oct. 26, 2001  (TW) ............... 90126508 A

(51) Int. Cl.
*H04J 3/00* (2006.01)
*H04J 3/16* (2006.01)
*H04B 7/212* (2006.01)

(52) U.S. Cl. .............. 370/337; 370/347; 370/468
(58) Field of Classification Search ........... 370/337, 370/347, 468
See application file for complete search history.

(56) References Cited

U.S. PATENT DOCUMENTS

| | | | | |
|---|---|---|---|---|
| 5,737,318 A * | 4/1998 | Melnik | .................. | 370/254 |
| 5,978,364 A * | 11/1999 | Melnik | .................. | 370/320 |
| 6,925,069 B1 * | 8/2005 | Koos et al. | ............. | 370/334 |
| 2002/0041586 A1 * | 4/2002 | Hayashino et al. | ..... | 370/338 |
| 2002/0141375 A1 * | 10/2002 | Choi | ..................... | 370/347 |
| 2005/0175006 A1 * | 8/2005 | Miyazaki et al. | ....... | 370/389 |

\* cited by examiner

*Primary Examiner*—Chau Nguyen
*Assistant Examiner*—Hong Sol Cho
(74) *Attorney, Agent, or Firm*—Birch, Stewart, Kolasch & Birch, LLP.

(57) ABSTRACT

A system and method for coding identification in a wireless transmit and receive protocol for single-frequency peripheral devices. A wireless system, consisting of a first data transmitting unit, a second data transmitting unit, and a data receiving unit, is able to send a packet twice using an Amplitude-Shift Keying (ASK) Modulation technique, repeated sending, and a single frequency, during one packet transmission. In order to lower the cost of the wireless module, the length of a packet transmission period is to be four times the sum of the time required to send two separate packets, thus allowing simultaneous control of two data transmitting units, and recognition of two different packets using a single data receiving unit.

14 Claims, 11 Drawing Sheets

SYSTEM AND METHOD FOR CODING AND IDENTIFICATION IN A WIRELESS TRANSMIT AND RECEIVE PROTOCOL FOR SINGLE-FREQUENCY PERIPHERAL DEVICES

BACKGROUND OF THE INVENTION

1. Field of the Invention

The invention is a coding method and system. More specifically, the invention is a system and method for coding and identification in a wireless transmit and receive protocol for single-frequency peripheral devices such as a wireless mouse or keyboard.

2. Related Art

Most peripheral devices for computers today, such as keyboards or mice, perform data transfer through cords. The cords of these devices often limit movement, and prevent the user from operating at a distance.

Keyboards and mice with wireless designs that overcome the aforementioned problems have hit the market, but are accompanied by a relatively expensive price tag. Moreover, most of these wireless peripheral devices have been designed independently and therefore come with their own set of transmit and receive units. If one purchases two wireless peripheral devices, one would also have bought two separate sets of wireless transmission and reception units, wasting money on functionally redundant devices.

Yet another product uses only one receiving unit for the wireless keyboard and mouse, however some issues still remain. For example, the wireless keyboard and wireless mouse use different carrier frequencies, thus requiring different designs in the wireless transmitting and receiving devices. That is, the receiving unit must receive two distinct frequencies. Referring to FIG. 1, the first data-transmitting unit 10 (e.g. a mouse) uses a carrier frequency F1 to transmit data through a wireless transmission module 101, while the second data-transmitting unit 20 (e.g. a keyboard) uses a carrier frequency F2 to transmit data through a wireless transmission module 201. The receiving end, i.e. the data-receiving unit 30, receives both carrier frequencies F1 and F2 through a wireless reception module 301. Because of the discrepancy in the carrier frequencies, the first data-transmitting unit 10 and the second data-transmitting unit 20 must use different radio frequency (RF) modules, i.e. the wireless transmitting modules 101 and 201 must have different designs. Similarly, the receiving end, i.e. the data-receiving unit 30, must use two different frequency-switching technologies in its software design. In order to provide such technologies, a company must spend more on the R&D of both software and hardware design. This extra expenditure is then reflected in the price of the product. The current focus of R&D in the field has been to find a common transmit and receive protocol, and thus use only one frequency to achieve data transmission between multiple wireless peripheral devices.

SUMMARY OF THE INVENTION

In light of the aforementioned technical issues, the object of the invention is to provide a system and method for coding and identification in a wireless transmit and receive protocol for single-frequency peripheral devices. Using Amplitude-Shift Keying (ASK) Modulation and Time-Division-Multiplexing (TDM), the invention allows wireless peripheral devices (e.g. keyboard and mouse) to transmit and receive data using the same frequency. Such methods would considerably lower the cost and power consumption of the wireless module (e.g. RF or IR), and avoid the need to include complex frequency-switching technologies in the software of the system.

An additional object of the invention is to provide a system and method for coding and identification in a wireless transmit and receive protocol for single-frequency peripheral devices with unique identification codes to prevent interference from other home electronic devices.

Using the technology disclosed by the invention, a method is provided for coding and identification in a wireless transmit and receive protocol for single-frequency peripheral devices. The invention utilizes ASK Modulation, and a single frequency as the carrier frequency of a wireless system consisting of a first data-transmitting unit, a second data-transmitting unit and a data-receiving unit to achieve transmission of digital data through the procedures described hereinafter. Set the transmission time of the first data packet and first identification packet of the first data-transmitting unit and the second data packet and second identification packet of the second data-transmitting unit, and, by way of repeated sending, transmit the packets twice within one packet transmission period. Code the data content of the first data packet of the first data-transmitting unit and the second data packet of the second data-transmitting unit, and set the content of each block of the data packets according to the report rate of the first and second data-transmitting unit. Set the first ID packet of the first data-transmitting unit and the second ID packet of the second data-transmitting unit to differentiate the first data-transmitting unit and the second data-transmitting unit, and set the content of each block of the data packets according to the report rate of the first and second data-transmitting unit. Finally, configure an identification key, where the communication system is in a data-encoding mode and transmitting the first and second data packets. Pressing the identification key switches the system into a data-identifying mode that allows the system to send the first and second ID packets.

Using the aforementioned technologies, the invention provides a system for coding and identification in a wireless transmit and receive protocol for single-frequency peripheral devices. The system consists of: a first data-transmitting unit, with a first identification key to set the first ID packet, and a first wireless transmission unit to send a first data packet; a second data-transmitting unit, with a second identification key to set the second ID packet, and a second wireless transmission unit to send a second data packet; and, a data-receiving unit, with a third data-receiving unit used to receive the first data packet, the first ID packet, the second data packet and the second ID packet.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTIONS OF THE DRAWINGS

The invention will become more fully understood from the detailed description of given hereinafter. However, the drawings are for the purpose of illustration only, and thus are not limitative of the invention, wherein.

TABLE. 1 is the structure of a data packet of a mouse as described in the invention;

TABLE. 2 is the structure of a data packet of a keyboard as described in the invention;

TABLE. 3 is an illustration of an ID packet of a mouse as described in the invention; and TABLE. 4 is an illustration of an ID packet of a keyboard as described in the invention.

DETAILED DESCRIPTION OF THE INVENTION

Figure 1:
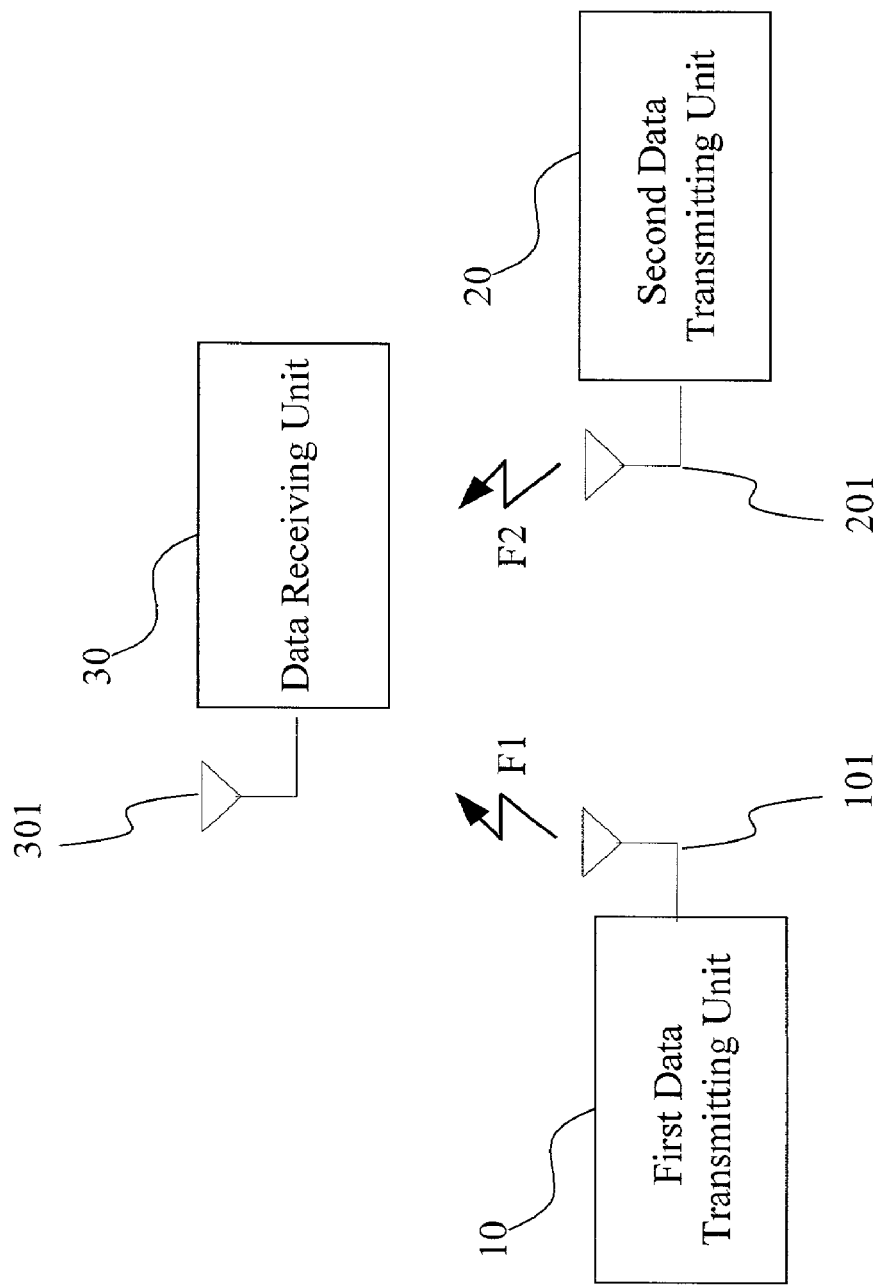
FIG. 1 is an illustration of the keyboard and mouse, each using a different carrier frequency.
Figure 2:
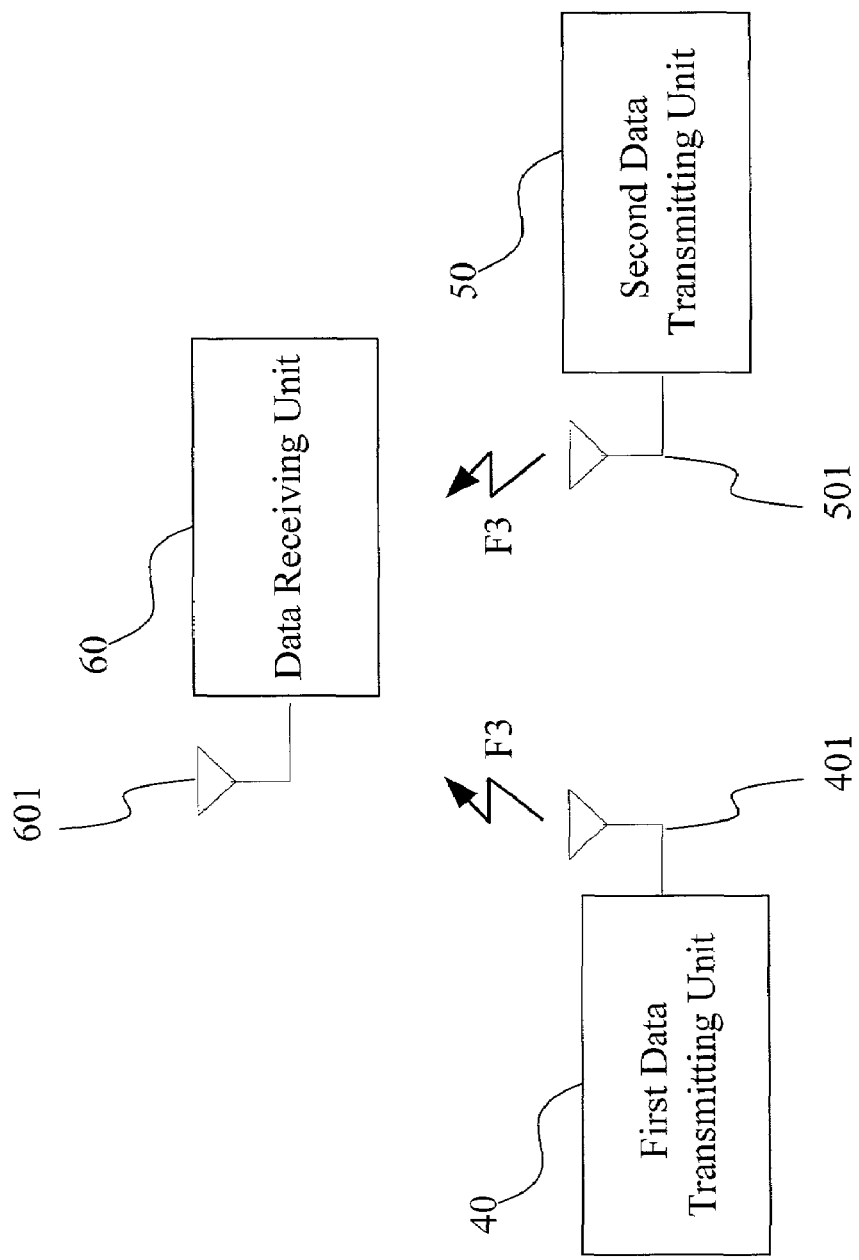
FIG. 2 is the system of the invention for coding and identification in a wireless transmit and receive protocol for single-frequency peripheral devices.

With reference to FIG. 2, which illustrates the system for coding and identification in a wireless transmit and receive protocol for single-frequency peripheral devices, the single-frequency system of the invention includes a first data-transmitting unit 40, a second data-transmitting unit 50 and data-receiving unit 60. The first data-transmitting unit 40 and the second data-transmitting unit 50 each have their own wireless transmission module 401 and 501, respectively. These two modules are structurally similar in that they can either be RF or IR transmission modules, using a common carrier frequency F3. The data-receiving unit 60 has a wireless reception module 601, which is only required to receive a single carrier frequency F3. Because the system of the invention uses only one carrier frequency on both the transmitting and the receiving end, it can adopt a relatively simple design.

The method with which the invention achieves transmission of two wireless peripheral devices using only one frequency, i.e. the method of the invention for coding and identification in a transmit and receive protocol for wireless single-frequency peripheral devices, is described hereinafter.

Figure 3:
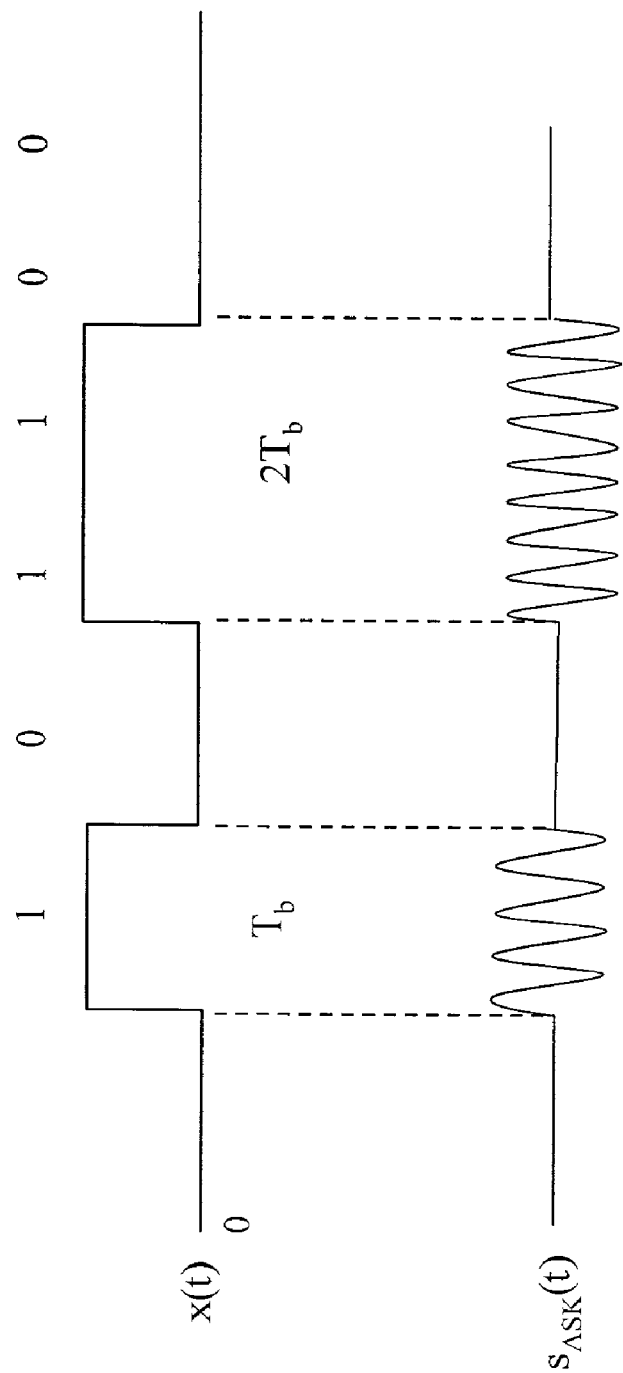
FIG. 3 is an illustration of ASK Modulation technology.

Firstly, since a single frequency is used, ASK Modulation technology is used. ASK Modulation technology is characterized by operation with one frequency, and can modulate the pulse width according to the length of consecutive 1's in the bit string. As in FIG. 3, the original digital signal x(t) is changed into signal $S_{ASK}(t)$ after ASK Modulation. The bit 1 becomes part of $S_{ASK}(t)$ where the pulse width is $T_b$, the bits 11 become part of $S_{ASK}(t)$ where the pulse width is $2T_b$, and 0's denote zero output. The system can thus conserve power at the wireless module.

Figure 4:
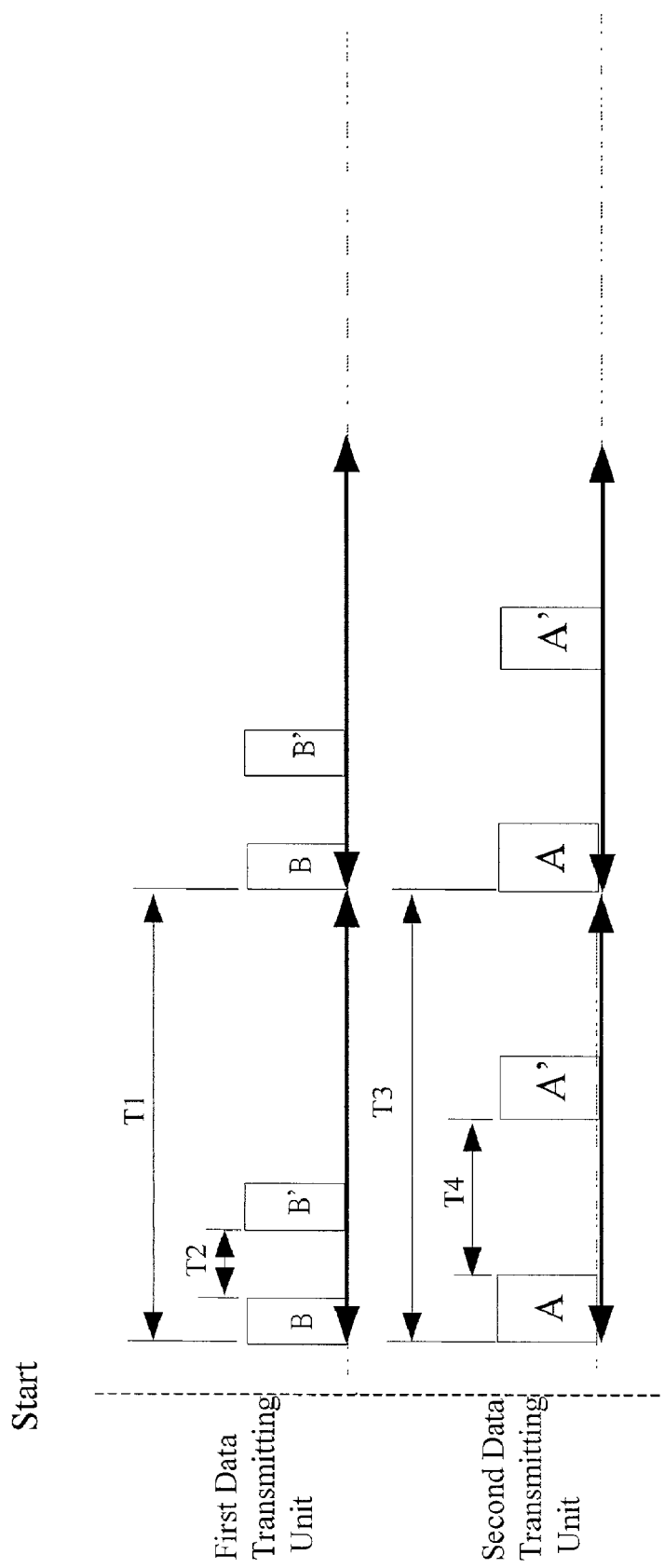
FIG. 4 is an illustration of the invention's transmission of packets by the data-transmitting unit.

Secondly, the system utilizes TDM to divide the pulse time between the peripheral devices, such as the first data-transmitting unit 40 and second data-transmitting unit 50 in FIG. 2. The details of this method are described hereinafter:

With reference to FIG. 4, the time required to send the data packet of the first data-transmitting unit is time B, where T1 is the time required to complete one transmission. To ensure that the packets are sent without distortion, each packet is sent twice, with time T2 being the time between each packet. The time required to send the data packet of the second data-transmitting unit is time A, where T3 is the time required to complete one transmission. The packets are also sent twice, with T4 being the time between each packet.

Figure 5:
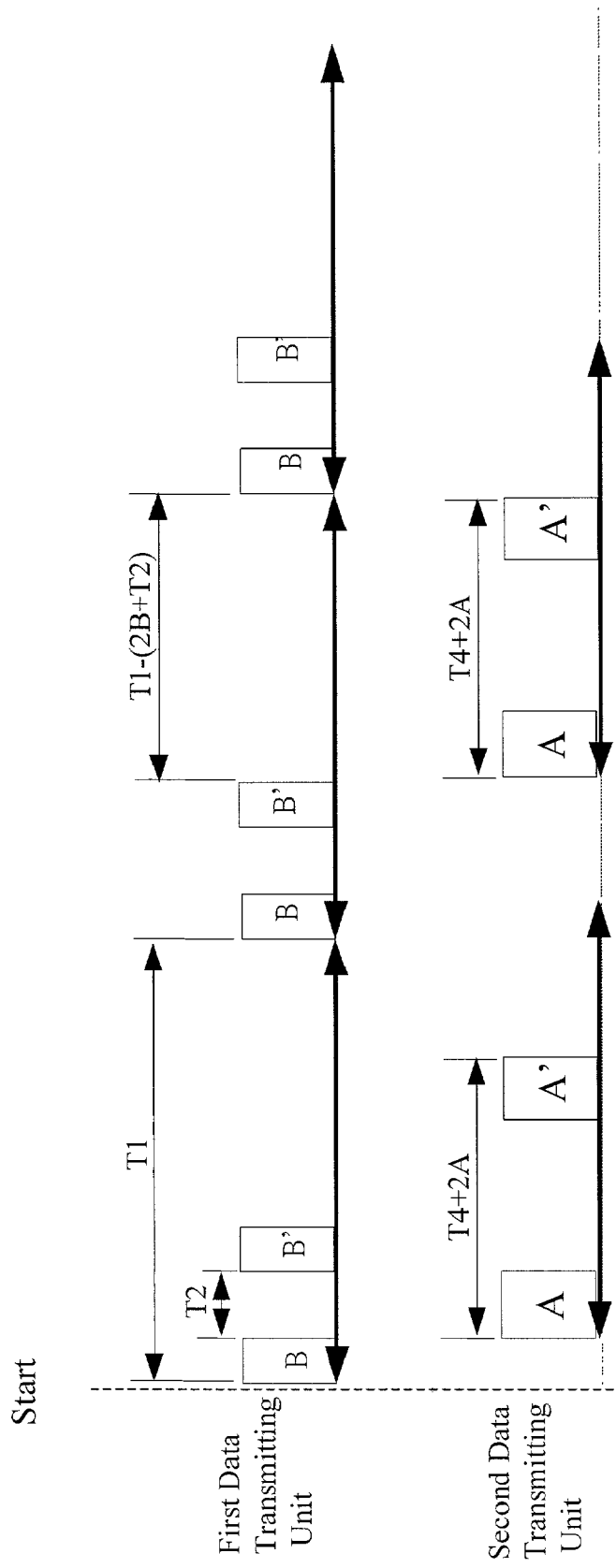
FIG. 5 is an illustration of the invention's transmission of packets from the point of view of the first data-transmitting unit.

However, in order to send two different packets in parallel, they must be sent at different moments in time, using TDM. From the first data-transmitting unit's point of view, the time gap T2 between 2 repeated data packet transmissions of the first data-transmitting unit must be longer than A, as in FIG. 5, $$T2 > A \quad (1)$$

The time difference between the total transmission time T1 of the first data-transmitting unit and the time for it to send the data packet twice (T2+2B) must be enough to encompass the time required for the second data-transmitting unit to send its packet twice, that is, $$T1-(T2+2B) \geq T4+2A \quad (2)$$

Figure 6:
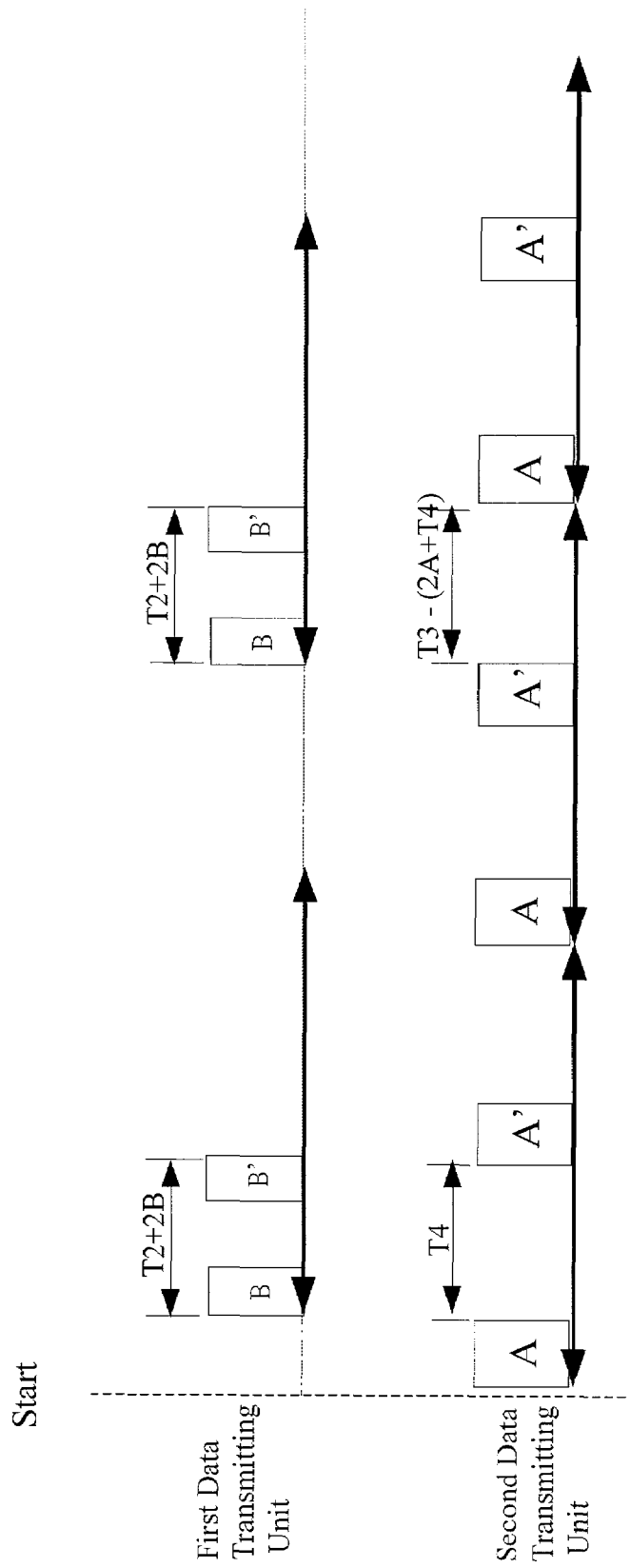
FIG. 6 is an illustration of the invention's transmission of packets from the point of view of the second data-transmitting unit.

From the second data-transmitting unit's point of view, the time gap T4 between repeated packet transmissions by the second data-transmitting unit is set to be longer than the time required for repeated sending of packets by the first data-transmitting unit, as in FIG. 6, $$T4 \geq T2+2B \quad (3)$$

The time difference between the total transmission time T3 of the second data-transmitting unit and the time for it to send the data packet twice (T4+2A) must be enough to encompass the time required for the first data-transmitting unit to send its packet twice, that is, $$T3-(T4+2A) \geq T2+2B \quad (4)$$

Combining equations 1~4, one can obtain the following:

$$T1 \geq 4(A+B) \quad (5)$$

and $$T3 \geq 4(A+B) \quad (6)$$

Therefore, the time required for a complete transmission by the first and second data-transmitting units has to be longer than four times the sum of the time required to send each individual packet.

Figure 7:
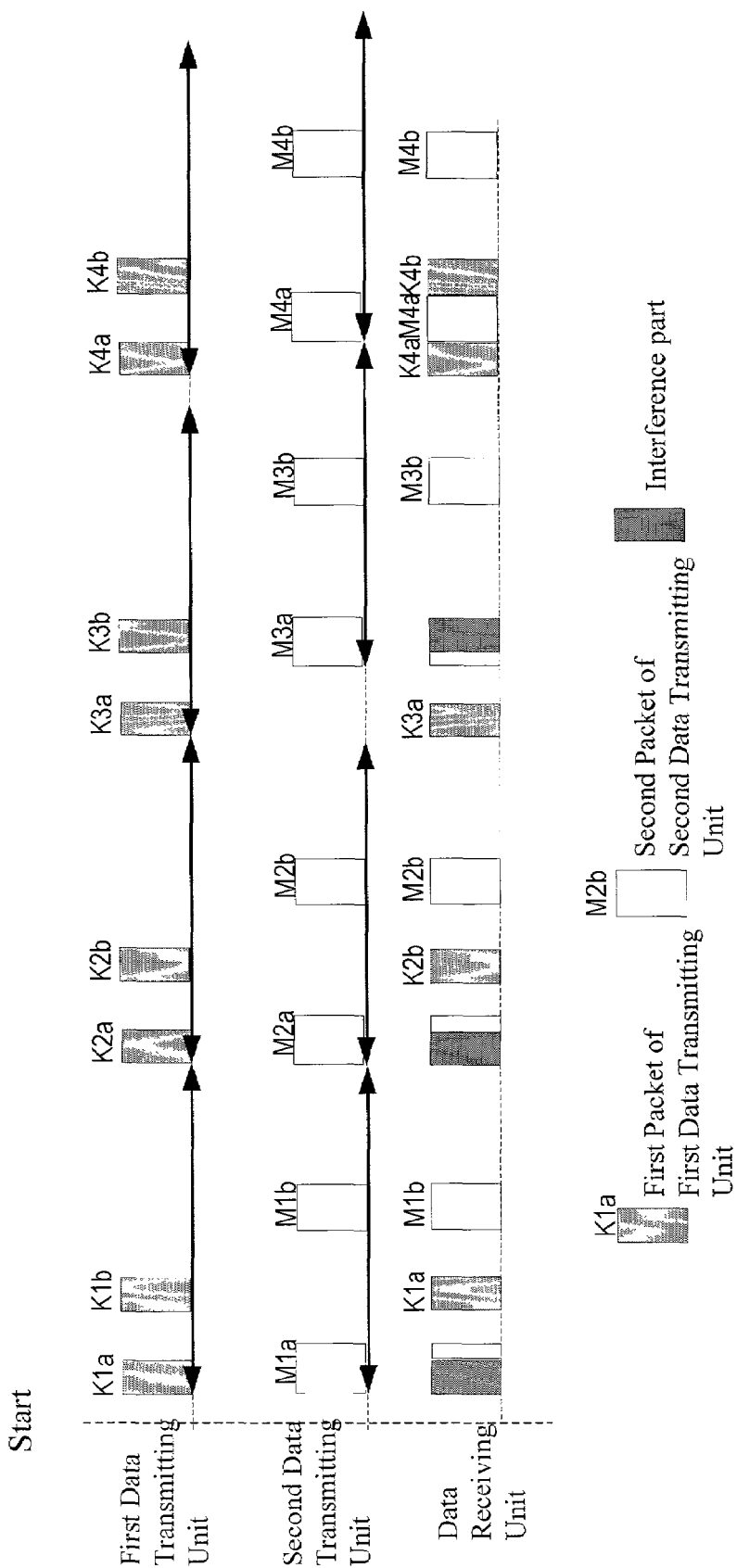
FIG. 7 is an illustration of the invention's transmission of packets from the point of view of the data-receiving unit.

The effect of the design is evident from the point of view of the receiving end. If the first and second data-transmitting units both transmit data at the same time, as in FIG. 7, the data packet received by the data-receiving unit is recognizable because of the overlapping of the data packets of the first and second data-transmitting units. However, since the time gap between repeated transmissions by the first data-transmitting unit is $T2 \geq A$, and the time gap between repeated transmissions by the second data-transmitting unit is $T4 \geq B$, if the first packets B and A overlap, [there cannot be another overlapping when the repeating packets B' and A']—(the grammar in this clause is unclear). The data-receiving unit can then correctly receive the packets B and A.

In fact, because of the repeated transmission design of the invention, the data-receiving unit can correctly receive the packets whether overlapping occurs or not during transmission. Thus, using TDM, the invention only requires one set of receiving devices at the receiving end, that is, the data-receiving unit is only required to recognize the contents of each individual packet.

The technique with which the invention handles two different peripheral devices, that is, the design of the packet contents, is described hereinafter, using the wireless mouse and wireless keyboard as practical examples. Since the mouse and the keyboard transmit different data, the design of the packets may differ. The detailed construction of the packets for the mouse and the keyboard are described separately hereinafter.

Table 1 is the data packet structure of the mouse. The mouse uses five bytes of data, each byte consisting of eight bits. The detailed description of each byte is as follows:

Byte 1 is the packet command, which consists of:
- Device type: used to identify the data-transmitting unit type, the mouse is identified as 10, for example.
- Sequence number (Seq. no): used to identify the sequence number of the packets recieved. For example, repeated packets have the same sequence number (e.g. 1 and 1, or 0 and 0), wheras two distinct packets have different sequence numbers; if one packet would be 1 and vice versa.
- Battery Low (Bat. Low): the status of the battery of the data-transmitting unit. 0 can be designated as normal, and 1 can be designated as battery low.
- Set: used to identify the ID code status. 0 can be designated to be transmitting, and 1 setting the ID code
- M: status of the middle button of the mouse; 1 signals a middle button pressed down.
- R: status of the right button of the mouse; 1 signals a right button pressed down.
- L: status of the left button of the mouse; 1 signals a left button pressed down.

Byte 2 is the data for the vector indicating the motion of the mouse in th x direction, where a negative direction is represented in 2's complement. If Set bit is 1, then byte 2 represents ID of the device.

Byte 3 is the data for the vector indicating the motion of the mouse in the y directin, where a negative direction is represented in 2's complement;

Byte 4 is the mouse command, which includes the rest of the mouse-related commands
- YS: the sign bit of the motion in the X direction.
- XS: the sign bit of the motion in the Y direction.
- Z0–Z3: motion of the mouse in the Z direction.
- B5: status of the fifth button of the mouse. 1 signals a pressed down.
- B4: status of the fourth button of the mouse. 1 signals a pressed down.

Byte 5 is Checksum, used to detect any errors associated with the packet.

Table 2 is the data packet structure of the keyboard. The keyboard uses three bytes, each byte consisting of eight bits. The detailed description of the bytes is as follows:

Byte 1 is the packet command, which consists of:
- Device type: used to identify the data-transmitting unit type; the keyboard is identified as 01, for example.
- Sequence number: used to identify the sequence number of the packets recieved. For example, the repeat packets have the same sequence number (e.g. 1 and 1, or 0 and 0), whereas two distinct packets have different sequence numbers; if one packet has the squence number 0, then the neighboring packet would be 1 and vice versa.
- Battery Low: the status of the battery of the data-transmitting unit. 0 can be designated as normal, and 1 can be designated as battery low.
- Set: used to identify the ID code status. 0 can be designated to be transmitting, and 1 setting the ID code.
- M/B: indicates whether the key is being hit or deleted; M indicates a make, B indicates a break.
- End: status of the key board. 0 can be designated as having at least one key in use, while 1 can be designated as having none of the keys in use.

Byte 2 is Key Number, which outputs the code of the keys used. If Set is 1, this byte is used as the device ID.

Byte 3 is Checksum, used to detect any errors associated with the packet.

Figure 8A:
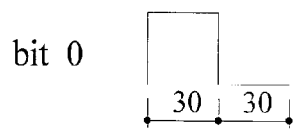
FIGS. 8A–8E are illustrations of the bit coding of the invention.

The start and end codes, as well as the encoding of each bit, must be defined properly in reference to FIGS. 8A–8E. It must be emphasized that in the aforementioned examples, the mouse uses 40 bits of data, while the keyboard uses 24 bits. In reality, the report rate of a mouse (standard PS/2) or a keyboard is at least 40 times per second. That is, at least 40 packets of data can be sent each second, and therefore each packet is to be sent within 25 ms. The packet transmission time is further restricted by equations 5 and 6:

$$T1 \geq 4(A+B) \qquad (5)$$

$$T3 \geq 4(A+B) \qquad (6)$$

Where the complete packet transmission time is to be larger than four times the sum of the time required to send a mouse packet and a keyboard packet. Under these restrictions, the following time settings for the bits can be made to keep the complete packet transmission time to 24 ms:

Bit 0 set to be 30 μs of high potential and 30 μs of zero potential, as in FIG. 8A.

Figure 8B:
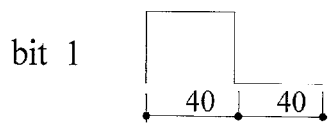

Bit 1 set to be 40 μs of high potential and 40 μs of zero potential, as in FIG. 8B.

Figure 8C:
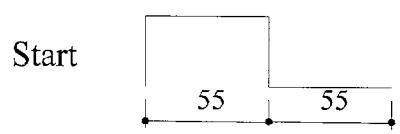

Packet Start Data det to be 55 μs of high potential and 55 μs of zero potential, as in FIG. 8C.

Figure 8D:
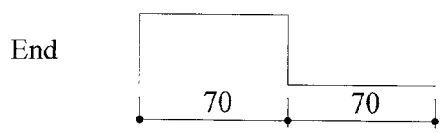

Packet End Data set to be 70 μs of high potential and 70 μs of zero potential, as in FIG. 8D.

Figure 8E:
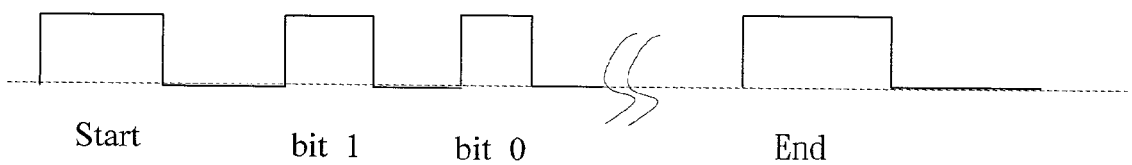

Using this time designation, the entire packet is structured as indicated in FIG. 8E, and can be achieved by ASK Modulation from start to end without any recognition error. Furthermore, the wireless module can use either an RF or IR module. The packet length of the mouse and keyboard under such a design can be controlled within 6 ms, fulfilling the aforementioned requirements.

Figure 9:
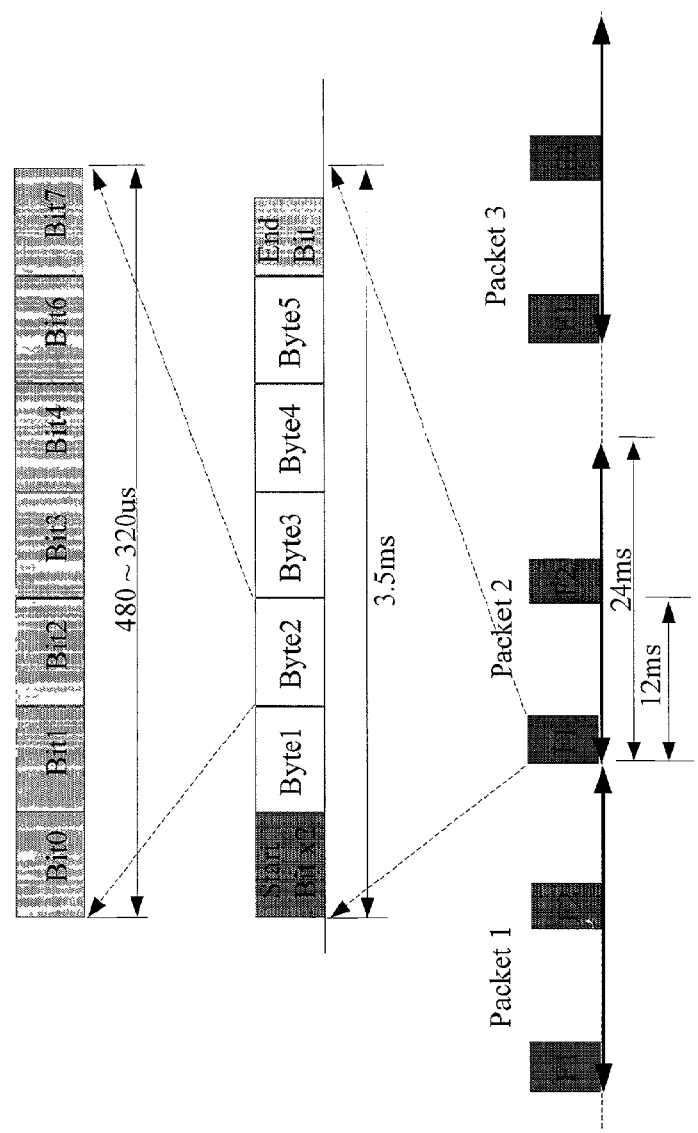
FIG. 9 is an illustration of a data packet of a mouse as described in the invention.
Figure 10:
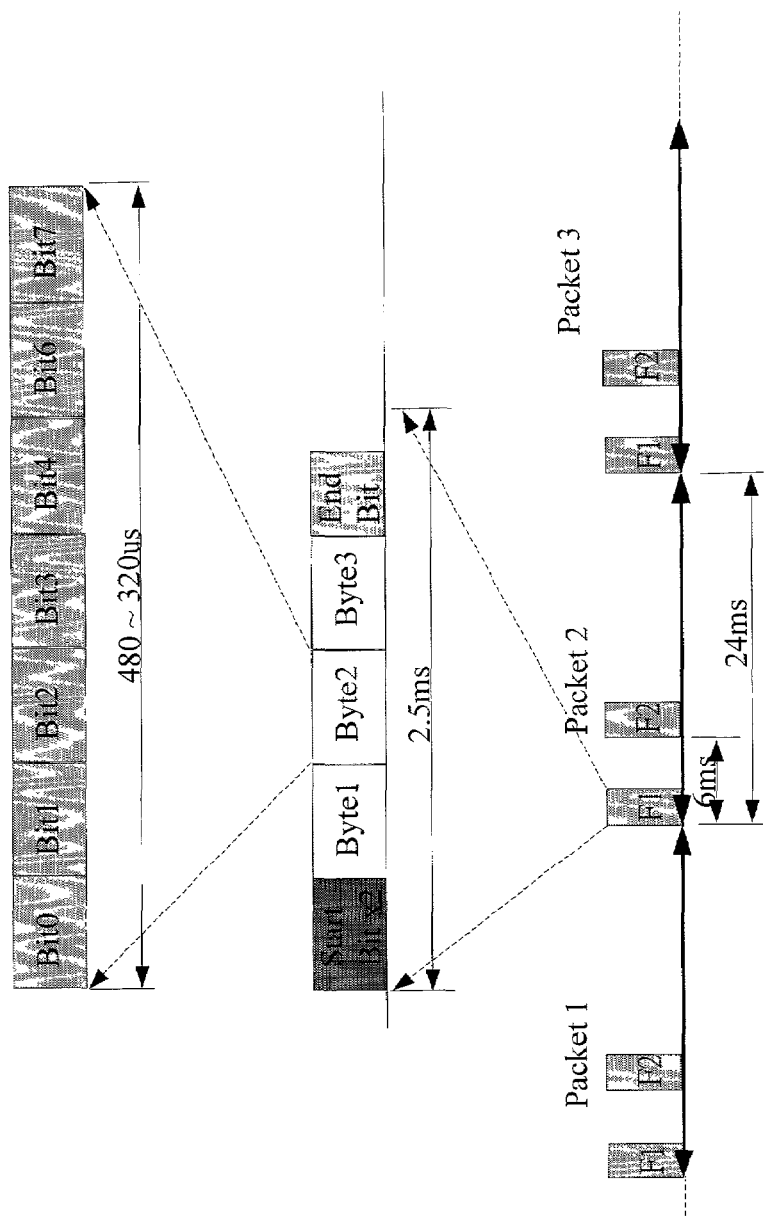
FIG. 10 is an illustration of a data packet of a keyboard as described in the invention.

Having briefly defined the contents of a packet, more details can be added to the data packet structure of the invention, described hereinafter with reference to FIG. 9, which is an illustration of the data packet of a mouse, and FIG. 10, which is an illustration of the data packet of a keyboard. Each byte contains 8 bits. Since the invention designates different lengths for the bits 0 and 1, the duration of each byte of data is roughly between 320~480 μs. The length of a data packet structure for the mouse is around 3.5 ms whereas the length of a data packet structure for the keyboard is around 2.5 ms. The complete packet transmission of both devices is approximately 24 ms.

One part of the system remains undefined. The invention is a system for a wireless transmit and receive protocol, which makes it necessary for the system to have the ability to identify neighbouring wireless systems. This is achieved by setting the ID code.

Figure 11:
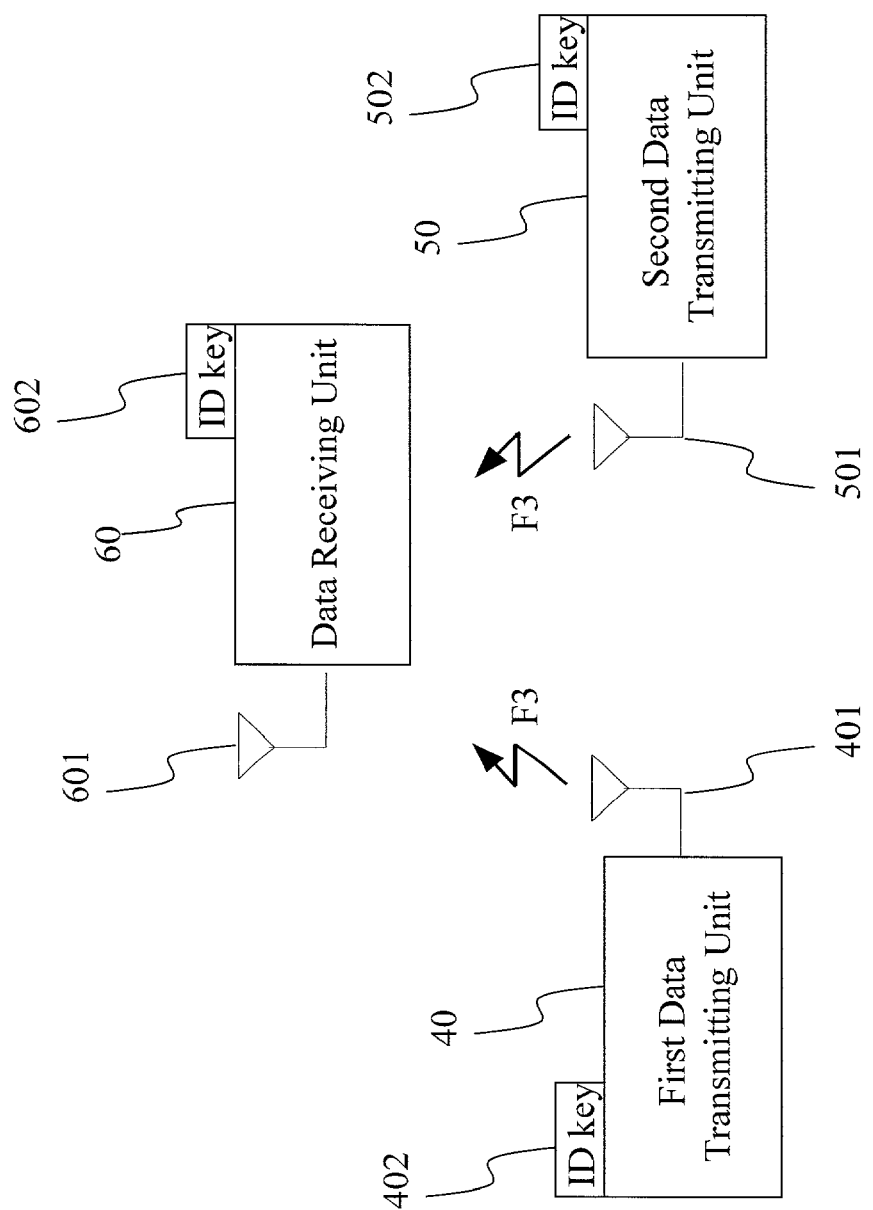
FIG. 11 is an illustration of the system of the invention for coding and identification in a wireless transmit and receive protocol for single-frequency peripheral devices with the added ability to identify other similar systems.

With reference to FIG. 11, in comparison to FIG. 2, the system for coding and identification in a wireless transmit and receive protocol for single-frequency peripheral devices further includes the ability to identify other similar systems. On each of the first data-transmitting unit 40, second data-transmitting unit 50 and data-receiving unit 60, an ID key 402, 502, and 602 is added, respectively. These ID keys are used to set each transmit/receive unit so that the units "know" to which other unit it corresponds. The content of these keys are properly recorded in the data packets.

The sequence to set a new ID code can be designated as the following procedure: First press the ID keys 402 and 502 for the first and second data-transmitting units, respectively, then press the ID key 602 of the data-receiving unit 60.

With reference to Tables 1 and 2, while setting a new ID code, the 'Set' bit of the first byte of the mouse and the keyboard data packets (i.e. the first data-transmitting unit 40 and second data-transmitting unit 50) is 1. At this point in time, the mouse sends data as indicated in Table 3. As in Table 1, the mouse uses up 5 bytes, each byte consisting of 8 bits. The detailed description of each byte is as follows:

Byte 1 is the packet command, which consists of: device type, sequence number, battery low, and set, as described in Table 1. A different set of bits, count down, contains 3 bits, and counts down from 7, decreasing with the transmission of each packet until it hits zero, which indicates that all packets sent after completed count down are to be sent with the new ID code.

Byte 2 is now changed to the ID of the device, which is generated randomly.

Byte 3 is Checksum.

Byte 4 is the 2's complement of Checksum, used to ensure that the packet content is correct.

Byte 5 is also Checksum.

The keyboard sends data as indicated in Table 4. As in Table 2, the keyboard uses 3 bytes, each byte consisting of 8 bits. The detailed description of each byte is as follows:

Byte 1 is the packet command, which consists of: device type, sequence number, battery low, and set, as described in Table 1. A different set of bits, count down, contains 3 bits, and counts down from 7, decreasing with the transmission of each packet until it hits zero, which indicates that all packets sent after completed count down are to be sent with the new ID code.

Byte 2 is now changed to the ID of the device, which is generated randomly.

Byte 3 is Checksum.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Byte | Description | 7 | 6 | 5 | 4 | 3 | 2 | 1 | 0 |
|---|---|---|---|---|---|---|---|---|---|
| 1 | Packet Command | Device Type | | Seq. no | Bat. Low | Set | M | R | L |
| 2 | X | X7 | X6 | X5 | X4 | X3 | X2 | X1 | X0 |
| 3 | Y | Y7 | Y6 | Y5 | Y4 | Y3 | Y2 | Y1 | Y0 |
| 4 | Mouse Command | YS | XS | B5 | B4 | Z3 | Z2 | Z1 | Z0 |
| 5 | Checksum | | | | ChkSum | | | | |

TABLE 2

| Byte | Description | 7 | 6 | 5 | 4 | 3 | 2 | 1 | 0 |
|---|---|---|---|---|---|---|---|---|---|
| 1 | Packet Command | Device Type | | Seq. no | Bat. Low | Set | | M/B | End |
| 2 | Scanned Key | | | | Key Number | | | | |
| 3 | Checksum | | | | ChkSum | | | | |

TABLE 3

| Byte | Description | 7 | 6 | 5 | 4 | 3 | 2 | 1 | 0 |
|---|---|---|---|---|---|---|---|---|---|
| 1 | Packet Command | Device Type | | Seq. no | Bat. Low | Set | Count Down | | |
| 2 | X | | | | New ID | | | | |
| 3 | Y | | | | ChkSum | | | | |
| 4 | Mouse Command | | | | ChkSum | | | | |
| 5 | Checksum | | | | ChkSum | | | | |

TABLE 4

| Byte | Description | 7 | 6 | 5 | 4 | 3 | 2 | 1 | 0 |
|---|---|---|---|---|---|---|---|---|---|
| 1 | Packet Command | Device Type | | Seq. no | Bat. Low | Set | Count Down | | |
| 2 | Scanned Key | | | | New ID | | | | |
| 3 | Checksum | | | | ChkSum | | | | |

What is claimed is:

1. A method for coding and identification in a wireless transmit and receive protocol for single-frequency wireless peripheral devices, using ASK Modulation and setting a single frequency as the carrier frequency of a wireless system having a first data-transmitting unit, a second data-transmitting unit and a data-receiving unit, to achieve transmission of digital data, the method comprises the steps of:

setting the packet transmission time of the first data packet and first ID packet of the first data-transmitting unit, and the second data packet and second ID packet of the second data-transmitting unit, and sending the packet twice during one packet transmission time;

encoding the data of the first data packet of the first data-transmitting unit, and the second data packet of the second data-transmitting unit, and setting each block of the data packet according to the report rate of the first data-transmitting unit and the second data-transmitting unit;

setting the first ID packet of the first data-transmitting unit and the second ID packet of the second data-transmitting unit to differentiate the first data-transmitting unit and the second data-transmitting unit, and setting the content of each block of the data packets according to the report rate of the first and second data-transmitting unit; and configuring an identification key, where the communication system is in a data-encoding status and transmitting the first and second data packets, and pressing the identification key switches the system into a data-identifying status that allows the system to send the first and second ID packets.

2. The method according to claim 1, wherein the first data-transmitting unit is a wireless keyboard, the second data-transmitting unit is a wireless mouse, the first data packet is a keyboard data packet, the second data packet is a mouse data packet, the first ID packet is a keyboard ID packet, and the second ID packet is a mouse ID packet.

3. The method according to claim 1, wherein said single-frequency transmission device is selected from the group consisting of a RF transmission device and an IR transmission device.

4. The method according to claim 1, wherein the repeated sending method sends a first data packet, and sends it again after time A, and completes within time T1, where T1>= (4A+4B); the repeated sending method sends the second data packet twice, with a time of separation of (A+2B), and completes within T3, where T3>=(4A+4B), A is the time required to send the second data packet, and B is the time required to send the first data packet.

5. The method according to claim 1, wherein the repeated sending method sends a first ID packet, and sends it again after time A, and completes within time T1, where T1>= (4A+4B); the repeated sending method sends the second ID packet twice, with a time of separation of (A+2B), and completes within T3, where T3=(4A+4B), A is the time required to send the second ID packet, and B is the time required to send the first ID packet.

6. The method according to claim 1 or 2, wherein the mouse data packet is a 5 Bytes structure, wherein the composition of each Byte is as follows:
Byte 1 is the packet command, which comprises of:
Device type: used to identify the data-transmitting unit type;
Sequence number: used to identify the sequence number of the packets recieved;
Battery Low: The status of the battery of the data-transmitting unit;
Set: used to identify the ID code status
M: status of the middle button of the mouse;
R: status of the right button of the mouse;
L: status of the left button of the mouse;
wherein the device type is two bits, and the rest are single bit;
Byte 2 is the data for the vector indicating the motion of the mouse in th y direction, where a negative direction is represented in 2's complement;
Byte 3 is the data for the vector indicating the motion of the mouse in the y directin, where a negative direction is represented in 2's complement;
Byte 4 is the mouse command, which includes the rest of the mouse-related commands
YS: the sign bit of the motion in the X direction.
XS: the sign bit of the motion in the Y direction.
Z0–Z3: motion of the mouse in the Z direction.
B5: status of the fifth button of the mouse.
B4: status of the fourth button of the mouse.
wherein the Z0–Z3 uses 4 bits, and the rest uses 1 bit each; and
Byte 5 is Checksum, used to detect any errors associated with the packet.

7. The method according to claim 1 or 2, wherein the keyboard data packet is a 3 Bytes structure, wherein the composition of each Byte is as follows:
Byte 1 is the packet command which consists of:
Device type: used to identify the data-transmitting unit type;
Sequence number: used to identify the sequence number of the packets recieved;
Battery Low: the status of the battery of the data-transmitting unit;
Set: used to identify the ID code status;
M/B: indicates whether the key is being hit or deleted;
End: status of the keyboard, indicating whether it is being used;
Byte 2 is the Key Number, which outputs the code of the keys used; and
Byte 3 is Checksum, used to detect any errors associated with the packets.

8. The method according to claim 1, 2, or 4, wherein the data packets of the mouse and the keyboard comprise of bits '0' and '1', packet start and packet end data, and the duration of the bits '0', '1', and the packet start and packet end data are to be controlled by ASK Modulation.

9. The method according to claim 8, wherein the bit 0 is 30 μs of high potential and 30 μs of zero potential; the bit 1 is 40 μs of high potential and 40 μs of zero potential; the packet start data is 55 μs of high potential and 55 μs of zero potential; the packet end data set to be 70 μs of high potential and 70 μs of zero potential.

10. The method according to claim 1 or 2, wherein the ID packet of the mouse is a 5 Bytes structure, where the composition of each Byte is as follows:
Byte 1 is the packet command, which consists of:
Device type: used to identify the data-transmitting unit type;
Sequence number: used to identify the sequence number of the packets recieved;
Battery Low: the status of the battery of the data-transmitting unit;
Set: used to identify the ID code status;
Count down: switches the ID status upon completeing count down;
wherein device type is two bit, count down is three bits, and the rest are one bit;
Byte 2 is now change to the ID of the device, which is generated randomly;
Byte 3 is Checksum;
Byte 4 is the 2's complemet of Checksum;
Byte 5 is Checksum.

11. The method according to claim 1 or 2, wherein the ID packet of the keyboard is a 3 Bytes structure, where the composition of each Byte is as follows:
Byte 1 is the packet command, which consists of:
Device type: used to identify the data-transmitting unit type;
Sequence number: used to identify the sequence number of the packets recieved;
Battery Low: the status of the battery of the data-transmitting unit;
Set: used to identify the ID code status;
Count down: Switches the ID status upon completing count down;
wherein device type is two bits, count down is three bits, and the rest are one bit;
Byte 2 is now changed to the ID of the device, which is generated randomly;
Byte 3 is Checksum.

12. The method according to claim 1, 2 or 5, wherein the ID packets of the mouse and the keyboard comprise of bits '0' and '1', packet start and packet end data, and the duration of the bits '0', '1', and the packet start and packet end data are to be controlled by ASK Modulation.

13. The method according to claim 12, wherein bit 0 is 30 µs of high potential and 30 µs of zero potential; bit 1 is 40 µs of high potential and 40 µs of zero potential; the packet start data is 55 µs of high potential and 55 µs of zero potential; the packet end data set to be 70 µs of high potential and 70 µs of zero potential.

14. A system for coding and identification in a wireless transmit and receive protocol for single-frequency peripheral devices, using ASK Modulation to control the time required by the system to transfer bits of the data packet, and repeated sending to send the data packet of the system twice, which comprises:

a first data-transmitting unithaving a first ID key used to set the first ID packet and a wireless transmission module used to transmit the first data packet, where the transmitting time of the first data packet and the first ID packet is (4A+4B);

a second data-transmitting unit, with a second ID key to set the second ID packet, and a wireless transmission module used to transmit the second data packet, where the transmitting time of the second data packet and the second ID packet is (4A+4B); and a data-receiving unit, with a third data-receiving unit, used to receive the first data packet, the first ID packet, the second data packet and the second ID packet;

wherein B is the transmission time of the first data packet or the first ID packet, while A is the transmission time for the second data packet or the second ID packet.

* * * * *